(12) United States Patent
Bigelow

(10) Patent No.: US 6,467,221 B1
(45) Date of Patent: Oct. 22, 2002

(54) SPACECRAFT SLEEPING BERTH

(75) Inventor: Robert T. Bigelow, Las Vegas, NV (US)

(73) Assignee: Bigelow Development Aerospace, Las Vegas, NV (US)

(*) Notice: Subject to any disclaimer, the term of this patent is extended or adjusted under 35 U.S.C. 154(b) by 3 days.

(21) Appl. No.: 09/644,935

(22) Filed: Aug. 23, 2000

(51) Int. Cl.$^7$ .................................................. E04B 1/34
(52) U.S. Cl. ...................... 52/2.17; 52/2.11; 52/79.1; 244/158 R; 244/159
(58) Field of Search ........................ 52/2.11, 2.17, 52/79.1, 2.16, 2.18, 2.19; 244/158 R, 159, 118.5, 118.6; 5/1, 9.1; 105/314, 316, 319

(56) References Cited

U.S. PATENT DOCUMENTS

| | | | |
|---|---|---|---|
| 3,629,875 A | * | 12/1971 | Dow ............................ 4/146 |
| 4,505,078 A | | 3/1985 | Huh |
| 4,594,817 A | | 6/1986 | McLaren |
| 4,745,643 A | | 5/1988 | Clarke |
| 5,429,851 A | * | 7/1995 | Sallee ........................ 428/71 |
| 5,630,296 A | * | 5/1997 | Kendall, Jr. ................ 52/2.11 |
| 6,029,404 A | * | 2/2000 | Lewis ....................... 52/2.18 |

* cited by examiner

*Primary Examiner*—Carl D. Friedman
*Assistant Examiner*—Jennifer I. Thissell
(74) *Attorney, Agent, or Firm*—Sierra Patent Group, Ltd.

(57) ABSTRACT

The present invention provides an improved sleeping berth for space modules that can be expanded from a collapsed position to provide greater passenger comfort in a larger living space. The extension of the berth is accomplished using expandable gas inflated bellows between two hard surface housings. The berth can be retracted into its closed position simply by removing the air pressure from the bellows. The berth's retracted position may still accommodate a passenger and may be used in this position when space is unavailable for the berth's extension.

27 Claims, 5 Drawing Sheets

SPACECRAFT SLEEPING BERTH

BACKGROUND OF THE INVENTION

1. Field of the Invention

The present invention relates to the field of modular sleeping quarters typically used to accommodate traveling passengers and crew in transport modes with limited space availability. The present invention more specifically relates to the special needs, concerns, and constraints imposed for a sleeping berth in orbiting space structures or spacecraft.

2. Discussion of the Prior Art

The use of modular sleeping quarters in conjunction with the transportation of passengers has a long and crowded field of art. Previously devised modular sleeping berths consist of a variety of structural configurations, designed and developed for the fulfillment of a number of objectives and requirements. In this respect, the present invention departs from the conventional concepts and designs of the prior art. In so doing, the present invention provides a sleeping berth primarily developed to provide comfort and safety for its occupants while travelling in space.

The field of modular sleeping quarters, or sleeping berths, has a number of common denominators in the prior art. Among them is a generally fixed physical passenger space. The current technology, which exists on the space shuttle and the International Space Station, provides substantially the same standard berths. These berths have a fixed geometry, and curtains (or panels) for privacy. Sleeping restraints are provided in the form of sleeping bags attached to a padded board. These restraints keep the astronauts in place while sleeping, and provide a feeling of gravity that assists with sleeping comfort. In general, these berths are the same standard berths commonly found in ships, trains and other prior art designs.

The berths currently used on the space shuttle and the International Space Station fail to provide sufficient space, privacy and noise abatement for their occupants. As the duration of space missions increase, the need to retreat from the social collective will become increasingly important. Such a retreat will have to offer living quarters with significantly more space, privacy, and tranquility than that afforded by the currently available berths.

An improved sleeping berth is needed to accommodate the special needs and concerns aboard spacecraft. Such a berth, because of limited space availability, must be expandable when in use, and later when not in use, be retractable to conserve space. An improved sleeping berth is needed that functions environmentally like a private room when in use, and yet is compact and space efficient when not in use.

SUMMARY OF THE INVENTION

An improved sleeping berth for the transportation and accommodation of passengers and crew is needed for spacecraft. The present invention provides a collapsible sleeping berth that can be stowed in a compressed position, or extended to form a sleeping berth with significantly more living space.

In the preferred embodiments, the sleeping berth is principally formed by two housings, with an expandable member connected between the two housings. The expandable member may take the form of a bellows shaped bladder. Admitting fluid from a fluid source into the interior volume of the expandable member extends the expandable member. When inflated with pressurized gas (such as air) from a pressurized gas source, the expandable member extends and pushes the housings apart to form a much larger berth. In lieu of pressurized gas, any liquid (such as water) may be used to fill and extend the expandable member.

The berth's fluid filled bladder provides several advantages in spacecraft applications. First, the bladder can be compressed to a fraction of its size, allowing the two housings to mate together into a very compact volume. When additional living space is desired, the bladder can be filled with air to provide substantial expansion of the living area with minimal increase in weight.

Another advantage of the fluid filled bladder is that it reduces the sound level within the berth, attenuating noise emanating from machinery and other activities aboard the spacecraft. The sound attenuation of the present invention provides a comfortable environment for living, working, and sleeping.

Yet another advantage of one of the embodiments is that the berth may form a single contiguous enclosure in the retracted position. This simplifies the transportation and relocation of the berth. The hard rigid outer shell of the retracted berth also protects the expandable member against puncture or other damage. The retracted berth may also provide a fire and smoke resistant safe haven. The hard fire resistant surfaces of the two mating housings completely enclose the passengers inside the berth, forming a barrier to resist smoke and fire intrusion.

Still another advantage is that when water is used as a fill fluid, the berth is transformed into a radiation shelter that can provide significant protection against normal space radiation and radiation emanating from solar events. To obtain the advantages of both the lightweight of the gas inflated member, and the radiation protection of the water fill fluid, the expandable member may be selectively fed from either a liquid or a gas source. This allows the present invention to use more easily manageable pressurized gas during normal use, and in the rare event of a solar storm, to use water for its shielding capability.

In one embodiment, the stationary housing may be permanently, or semi-permanently attached to hard mounting points, such as a wall, on the spacecraft. In an alternate embodiment, the berth is not permanently attached to the spacecraft. The advantage of the alternate embodiment is that in its retracted position, the berth may be easily stored anywhere on the spacecraft. When required, the berth is deployed to wherever it is needed as a stand-alone unit.

The above summary provides a general outline of the present invention, its construction, and operation. The following are some of the objects of the invention and its advantages.

An object of the present invention is to conserve space aboard the spacecraft when the berth is not in use. An associated object is that the present invention minimizes the size of the berth's launch package, conserving space aboard the launch vehicle.

Another object of the present invention is to provide a berth with minimum weight to minimize launch costs. This is accomplished with the use of the pressurized bladder, which forms the majority of the berth's structure when deployed.

Various embodiments of the present invention that accomplish these goals, and have other significant advantages over prior art sleeping berths have been described above. These objectives and improvements are obtained with a unique collapsible berth that provides maximum living space during use, and yet can collapse to a fraction of its extended size.

This frees a substantial volume onboard the spacecraft for passengers to use during their waking hours for recreational activity, or by a crew for working space. The inflatable nature of the berth minimizes the weight of the berth, minimizing launch costs. The present invention, because of its transformable geometrical structure, can efficiently and effectively provide maximum useable living space with minimum impact on the mission capabilities of the spacecraft.

DETAILED DESCRIPTION OF THE PREFERRED EMBODIMENTS

Preferred embodiments of the present invention that illustrate the best mode now contemplated for placing the invention in practice is described as follows, and in conjunction with the attached drawings that form a part of this specification. The preferred embodiments are described in detail without attempting to show all of the various forms and modifications in which the present invention may be embodied. The preferred embodiments described are illustrative, and as will become apparent to those skilled in the arts, can be modified in numerous ways within the spirit and scope of the invention, the invention being measured by the appended claims and not by the details of the specification.

Figure 1:
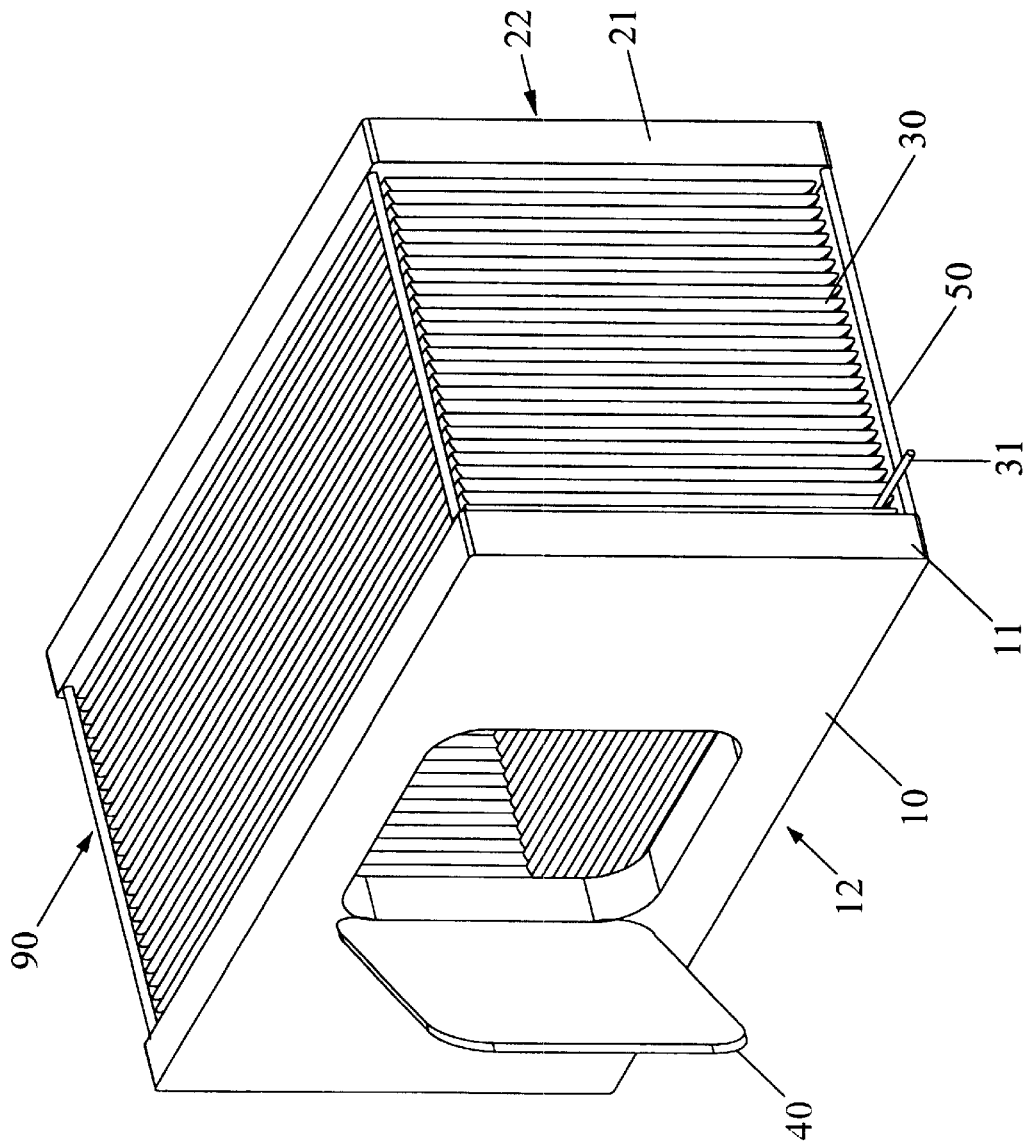
FIG. 1 is a perspective view of the sleeping berth in the extended configuration.
Figure 2:
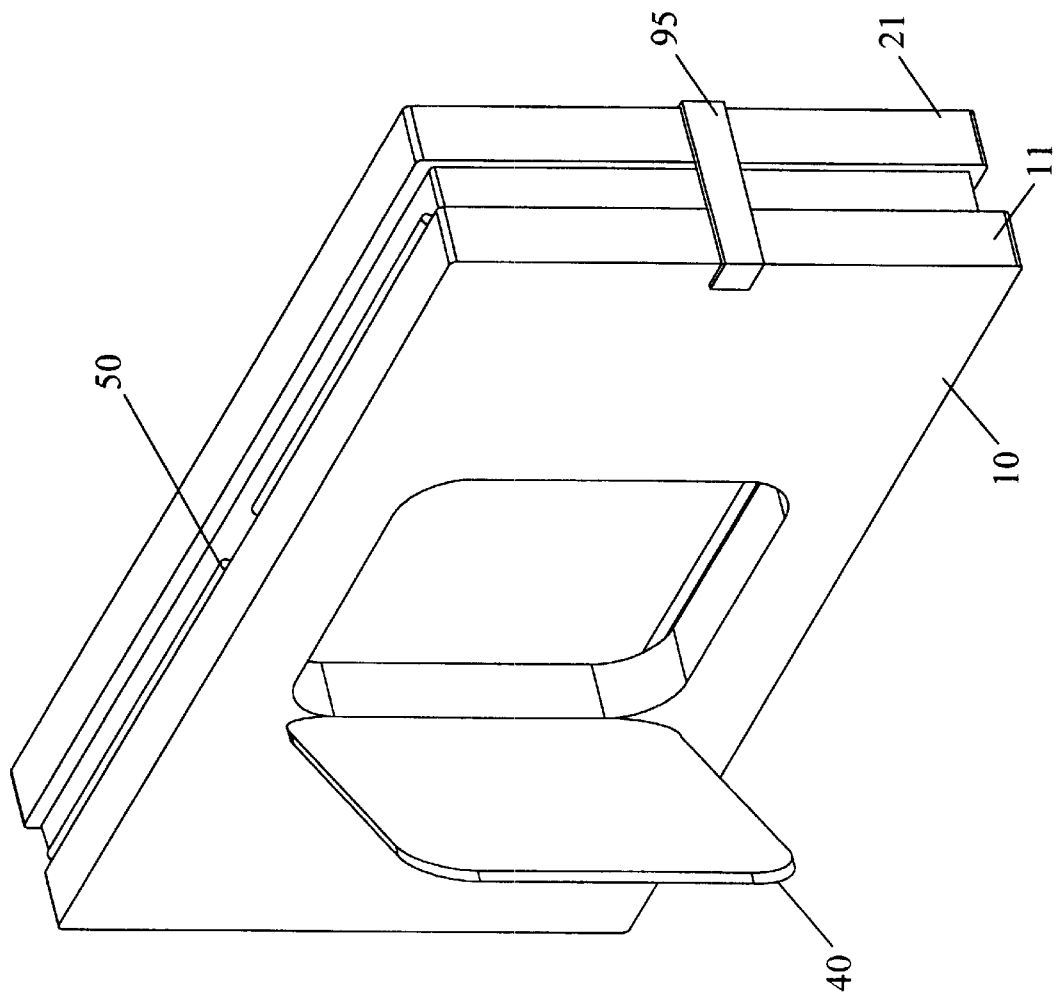
FIG. 2 is a perspective view of the sleeping berth in the retracted configuration.
Figure 3:
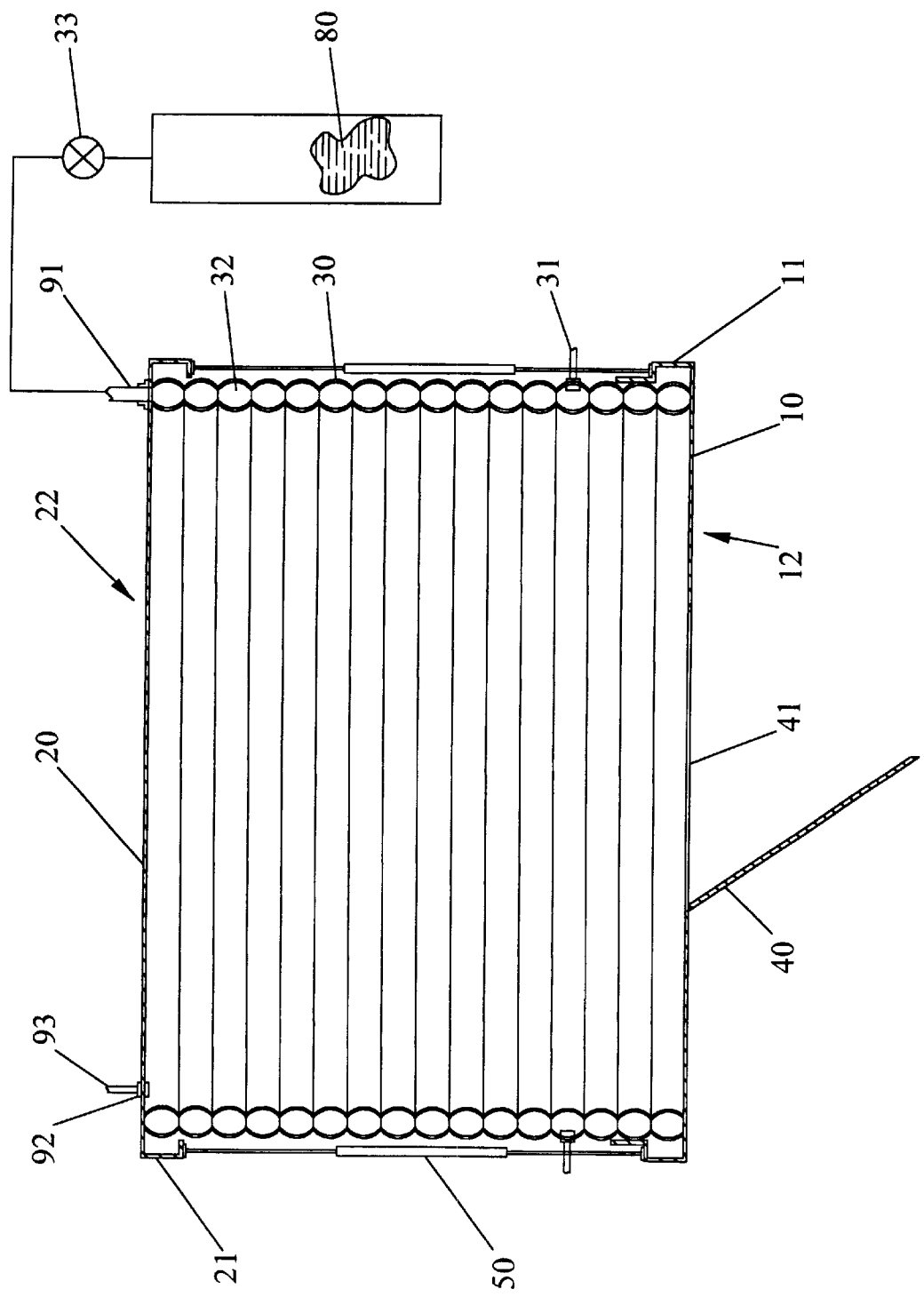
FIG. 3 is a cross sectional view of a berth embodiment with an expandable bladder with housings.
Figure 4:
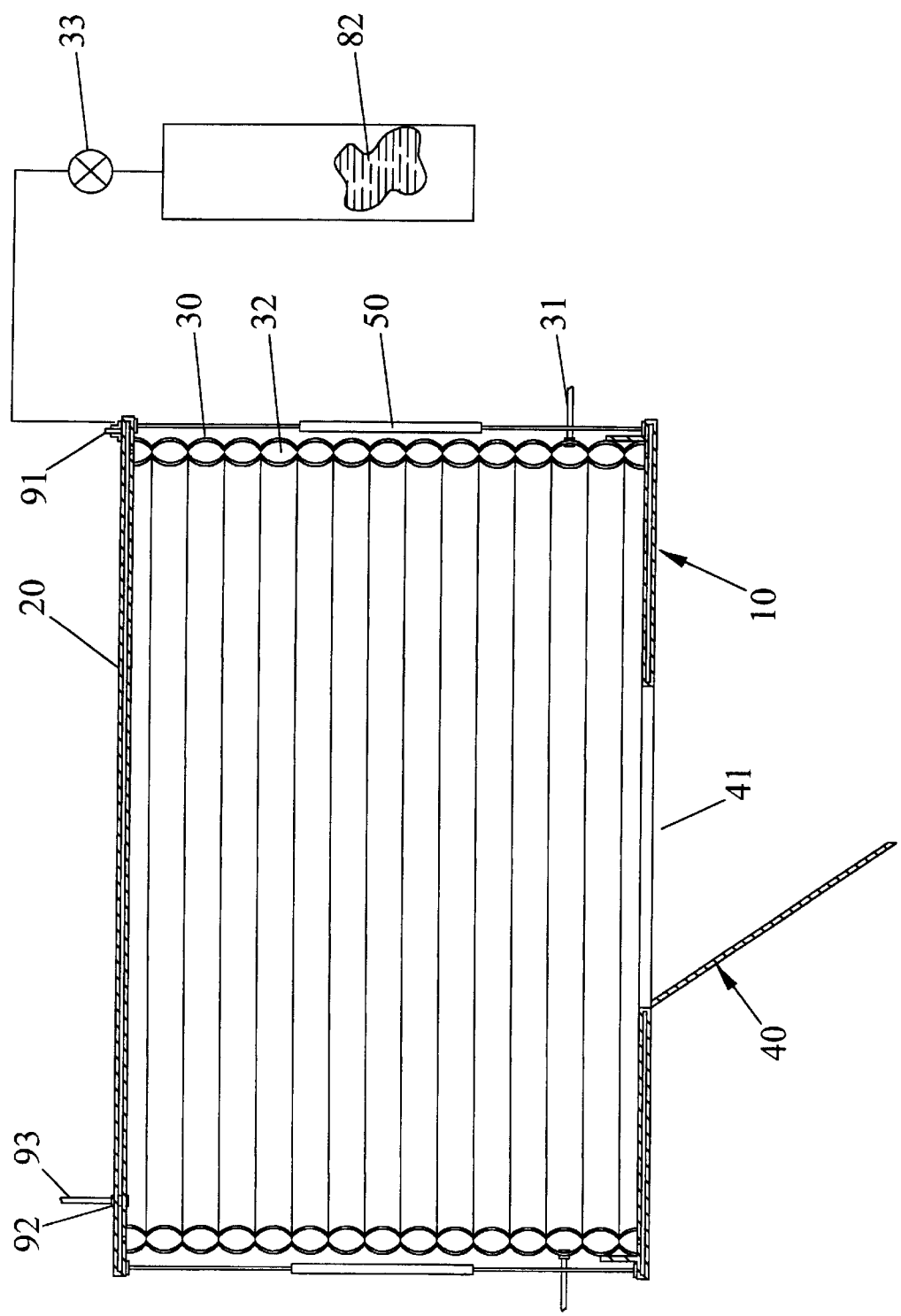
FIG. 4 is a cross sectional view of an alternate berth embodiment with an expandable bladder with end plates.
Figure 5:
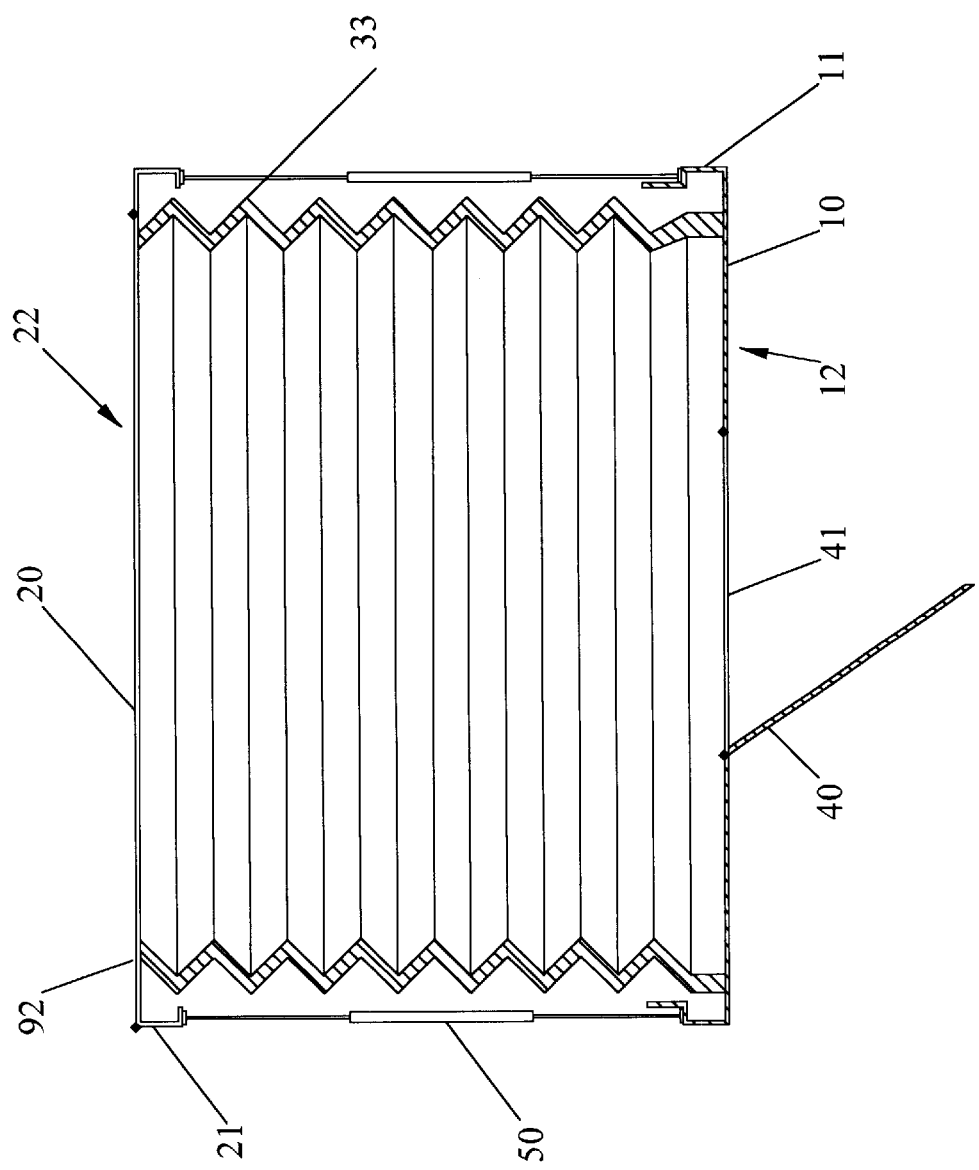
FIG. 5 is a cross sectional view of the berth with pleated sheet material forming the enclosure.

One of the preferred embodiments of the present invention is illustrated in FIG. 1 as a perspective view of the sleeping berth 90. The present invention has two end members, such as end plates 10, 20 that form opposite ends of the enclosure as shown in FIG. 3 and FIG. 4. These end plates may include additional features such as a flange 11, 21 to create housings 12, 22 as shown in FIG. 1. In a preferred embodiment, the berth 90 may be attached to the spacecraft wall. Consequently, the berth may have a stationary housing (attached to the wall) and a mobile housing.

In the preferred embodiment, the housings are substantially rigid to provide structural stability to the berth, and provide a means to mount the berth 90 to the spacecraft. The housing rigidity supports equipment mounted to the berth, as well as providing support to utility lines entering the berth. This rigidity also allows the development of a seal when the two housings contact in the fully retracted position. The end member may also be made from a flexible, fabric like, or elastomer material.

Connected between the two housings 12, 22 is an expandable member, such as a bellows shaped bladder 30. The expandable member has an interior volume 32 that may be pressurized with a gas, or otherwise filled with a liquid. Fabric-like materials such as Kevlar and Nomex are preferred for the construction of the bladder. These fabrics may be coated to make them airtight. The bellows shaped bladder provides maximum linear expansion when pressurized, or otherwise expanded.

In lieu of an expandable bladder, a bellows 33 constructed from sheet material may connect the housings. These sheets may be made from any variety of materials, and may include highly engineered polymeric materials. Certain specific polymeric materials are capable of providing significant sound deadening qualities. Sponge like materials, such as open cell elastomers, may also be used to form the bellows. The sponge like material may be used to provide additional rigidity and soundproofing to the berth. These elastomeric or polymeric layers are compressed as the two housings mate during retraction of the berth.

Once the housings are retracted for storage, a fastener 95 may be used to affix the housings together to ensure that they do not slip apart. When the berth is ready to be deployed, the fastener is released. A fluid source (e.g., a pressurized gas source 80, or a liquid source 82) is connected to the expandable member 30 to provide a fluid (either a liquid or a gas). This flow of fluid is controlled with the first valve 33 connected between the fluid source and the interior volume of the expandable member. As air is admitted to the bellows shaped bladder 30, the bladder stiffens, and expands to its fully extended position. The bladder's extension separates the two housings 12, 22 and expands the berth to form an enclosure for passengers.

When the berth is not in use, it may be compressed into a fully retracted position. To retract the berth, the second valve 31 is opened to release the contents of the bladder 30. In some of the liquid filled and pressurized gas embodiments, a second valve may not be necessary, and the fluid is simply returned back to the fluid source. When pushed together into the fully retracted position, the end plates and the flange(s) may in some embodiments, mate to form a single contiguous enclosure. The contact surfaces of the housings may be designed to provide a self-aligning, air tight seal, to mate the housings.

Additional structural rigidity may be desirable between the end plates to ensure that the end plates will not float out of alignment once the berth is extended. This rigidity stabilizes and makes the berth more comfortable for its occupants. The fully filled expandable member will have a considerable degree of rigidity by itself. This rigidity may be further enhanced with an extendable member, such as a telescoping tube 50. The extendable members attach between the two housings, and keep the housings aligned during use. The extendable members maintain the alignment of the berth during deployment and retraction, when the rigidity of the bladder is at a minimum. This ensures that the bellows retract uniformly without being pinched between the two housings.

The present invention contains an access port 41 to allow entrance into the berth. The access port may be located in either housing (or end plate). The access port may have a closure, such as a hatch 40, to provide privacy and security. Utilities may be supplied to the passengers in their berth. These utilities may include provision for water, electricity, communication, and pneumatic lines, as well as for HVAC ducts. The stationary housing may have an aperture 92 to provide access into the sleeping berth for utility lines 93. The spacecraft wall to which the stationary housing is attached may be used to support the utility lines brought into the berth.

An alternate embodiment of the present invention utilizes the same basic components as described in the above embodiment. In this alternate embodiment, however, the sleeping berth is not intended to be permanently attached to the spacecraft. This allows the berth to be stored anywhere when not in use. This nonpermanent attachment also simplifies spacecraft reconfiguration for other uses. When the berths are deployed, they can be temporarily affixed to the spacecraft to keep them from floating about the cabin.

The present invention has been described above with reference to certain preferred embodiments. It is understood that modifications and variations are possible within the scope of the appended claims that follow.

I claim:

1. A spacecraft sleeping berth comprising:
   a. a first end member having an access port;
   b. a second end member;
   c. a pressurized gas source;
   d. an expandable member having an interior volume, the interior volume of said expandable member connected to said pressurized gas source, said expandable member attached to said first end member and to said second end member, said expandable member and said end members defining an enclosure;
   e. a first valve connected between said pressurized gas source and said interior volume; and
   f. a second valve, said second valve connected to the interior volume of said expandable member; whereby said first valve may be selectively opened to pressurize and extend said expandable member, forcing said first and second end members apart into an extended position, and further, whereby the expandable member may be subsequently selectively depressurized by closing said first valve and opening said second valve, allowing said expandable member to be compressed into a retracted position.

2. A spacecraft sleeping berth as described in claim 1 wherein said first and said second end members are end plates.

3. A spacecraft sleeping berth as described in claim 2 wherein at least one of said end plates has a flange to form a housing to allow said end plates and said flange to form a contiguous enclosure in the retracted position.

4. A spacecraft sleeping berth as described in claim 1 further comprising a closure, said closure to selectively cover the access port in said first end member.

5. A spacecraft sleeping berth as described in claim 4 wherein said closure is a hatch, said hatch to seal the access port.

6. A spacecraft sleeping berth as described in claim 1 wherein said expandable member is a bellows shaped bladder.

7. A spacecraft sleeping berth as described in claim 1 further comprising at least one extendable member, said extendable member attached at one end to said first end member and the other end attached to said second end member.

8. A spacecraft sleeping berth as described in claim 7 wherein said extendable member is a telescoping member.

9. A spacecraft sleeping berth as described in claim 1 further comprising a fastener to restrain said first and said second end members in the retracted position.

10. A spacecraft sleeping berth comprising:
    a. a first end member having an access port;
    b. a second end member;
    c. a liquid source;
    d. a pressurized gas source;
    e. an expandable member having an interior volume, the interior volume of said expandable member connected to said liquid source and said pressurized gas source, said expandable member attached to said first end member and to said second end member, said expandable member and said end members defining an enclosure; and
    f. a first valve connected between said interior volume and said liquid source and said pressurized gas source, said first valve having a first, second and third position, said first position to selectively allow fluid communication between said interior volume and said pressurized gas source, said second position to selectively allow fluid communication between said interior volume and said liquid source, and a third position to selectively close communication between said interior volume and both said liquid source and said pressurized gas source; whereby said first valve may be selectively opened to extend said expandable member from either said liquid source or said pressurized gas source, and force apart said end members into an extended position, and further, whereby said expandable member may be subsequently selectively compressed into a retracted position.

11. A spacecraft sleeping berth as described in claim 10 wherein said first and said second members are end plates.

12. A spacecraft sleeping berth as described in claim 11 wherein at least one of said end plates has a flange to form a housing to allow said end plates and said flange to form a contiguous enclosure in combination with the spacecraft wall in the retracted position.

13. A spacecraft sleeping berth comprising:
    a. a first end member having an access port;
    b. a second end member;
    c. a pressurized gas source;
    d. an expandable member having an interior volume, the interior volume of said expandable member connected to said pressurized gas source, said expandable member attached to said first end member and to said second end member, said expandable member and said end members defining an enclosure;
    e. a first valve connected between said pressurized gas source and said interior volume;
    f. a second valve, said second valve connected to the interior volume of said expandable member; and
    g. a closure, said closure to selectively cover the access port in said first end member;
    whereby said first valve may be selectively opened to pressurize and extend said expandable member, forcing said first and second end members apart into an extended position, and further, whereby the expandable member may be subsequently selectively depressurized by closing said first valve and opening said second valve to allow said expandable member to be compressed into a retracted position.

14. A spacecraft sleeping berth as described in claim 13 wherein said first and said second end members are end plates.

15. A spacecraft sleeping berth as described in claim 14 wherein at least one of said end plates has a flange to form a housing to allow said end plates and said flange to form a contiguous enclosure in the retracted position.

16. A spacecraft sleeping berth as described in claim 14 further comprising a fastener for affixing said first and said second end plates in the retracted position.

17. A spacecraft sleeping berth comprising:
    a. a first end member having an access port;
    b. a second end member;
    c. a fluid source;

d. an expandable member having an interior volume, the interior volume of said expandable member connected to said fluid source, said expandable member attached to said first end member and to said second end member, said expandable member and said end members defining an enclosure; and e. a first valve connected between said fluid source and said interior volume;

whereby said first valve may be selectively opened to extend said expandable member, forcing said first and second end members apart into an extended position, and further, whereby said expandable member may be subsequently selectively compressed into a retracted position, once in the retracted position, said first valve being closed.

18. A spacecraft sleeping berth as described in claim 17 wherein said first and said second end members are end plates.

19. A spacecraft sleeping berth as described in claim 18 wherein at least one of said end plates has a flange to form a housing to allow said end plates and said flange to form a contiguous enclosure in the retracted position.

20. A spacecraft sleeping berth as described in claim 18 further comprising an extendable member, said extendable member attached at one end to said first end plate and the other end attached to said second end plate.

21. A spacecraft sleeping berth as described in claim 17 further comprising a closure, said closure to selectively cover the access port.

22. A spacecraft sleeping berth as described in claim 17 wherein said expandable member is a bellows shaped bladder.

23. A spacecraft sleeping berth comprising:

a. a first end member having an access port;

b. a second end member;

c. a bellows attached to said first end member and to said second end member, said bellows and said end members defining an enclosure;

d. an extendable member, said extendable member attached at one end to said first end member and the other end attached to said second end member;

whereby said first and second end members may be pulled apart into an extended position, and further, whereby said first and second end members may be compressed into a retracted position.

24. A spacecraft sleeping berth as described in claim 23 wherein said first and said second members are end plates.

25. A spacecraft sleeping berth as described in claim 24 wherein at least one of said end plates has a flange to form a housing to allow said end plates and said flange to form a contiguous enclosure in the retracted position.

26. A spacecraft sleeping berth as described in claim 1 wherein said second member is a spacecraft wall.

27. A spacecraft sleeping berth as described in claim 17 wherein said second member is a spacecraft wall.

\* \* \* \* \*